Jan. 12, 1937. H. B. NUMER 2,067,332
CONTROL FOR A SAFER OPERATION OF MOTOR VEHICLES
Filed May 6, 1936
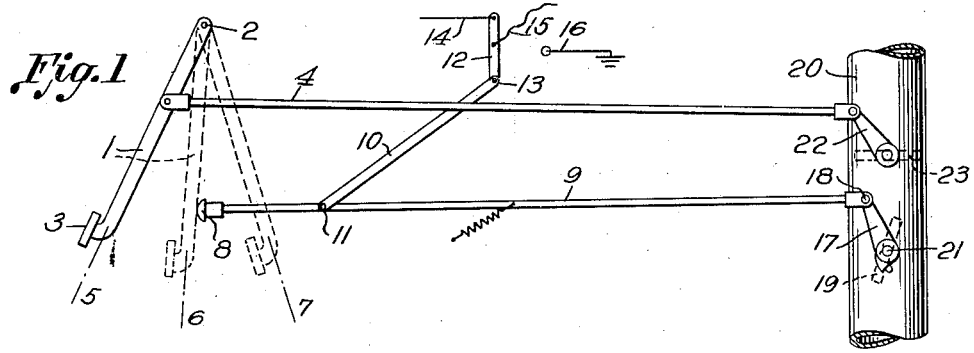
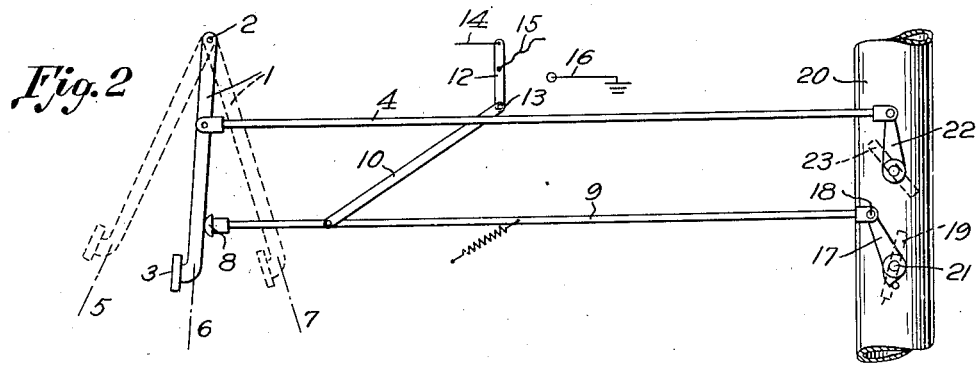
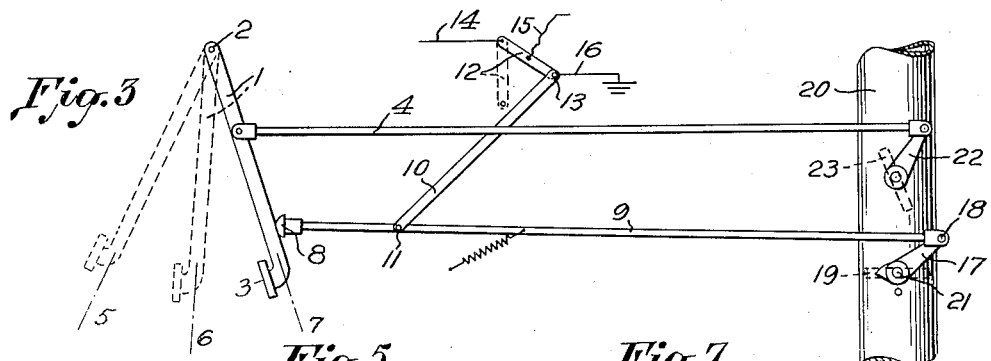
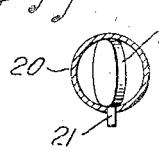
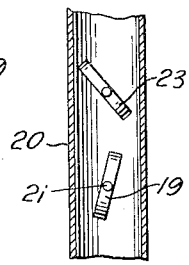
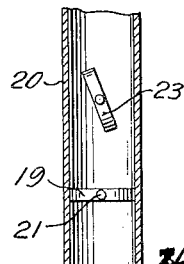
Inventor:
Harold Bolinger Numer Patented Jan. 12, 1937

2,067,332

UNITED STATES PATENT OFFICE 2,067,332

CONTROL FOR A SAFER OPERATION OF MOTOR VEHICLES

Harold Bolinger Numer, Cotter, Ark.

Application May 6, 1936, Serial No. 78,172

2 Claims. (Cl. 180—82)

The object of my invention is to close or shut off the source of fuel or energy to any motor vehicle, by the operator who thoughtlessly, when excited, intoxicated or under mental derangement, applies excessive fuel or energy.

This object is obtained by excess application of the same means used to apply energy but beyond the necessary application of energy applied to operate any motor vehicle. By excess application of the control or controls which apply energy, these controls can be made to come in contact with my new improvement and means of closing or shutting off all source of energy such as opening an electric circuit or closing any fuel valve and can be designed to operate on any motor vehicle.

In the accompanying drawing, Fig. 1 is a side elevation showing the controls when not applied; Fig. 2 is a similar view with the controls in the intermediate position; Fig. 3 is a similar view showing the safty control in fully applied position; Figs. 4 and 5 are detail sections showing the fuel control valve in open position; Figs. 6 and 7 are similar views showing the valve in closed position.

Referring to the drawing in detail, character 1 indicates a throttle control lever, pivoted at 2 upon the vehicle. Link 4 is pivoted at one end to the lever 1 and at its other end to the arm 22 of the throttle valve 23 which is disposed in the fuel line 20. A second valve 19 is disposed in the fuel line 20, and its arm 17 is connected to one end of the rod 9. The other end 8 of rod 9 is disposed in the path of movement of the lever 1. Link 10 is pivoted at one end to rod 9 and at its other end it is connected through insulated means 13 to the blade of a single-pole switch 12. Power for the ignition flows from 14 to 15, and 16 and is a grounded pole for the switch 12.

When the lever 1 is moved through the arc 5—6, it operates the valve 23 from closed to open position. If, however, the lever 1 is moved through the arc 6—7, the valve 19 is moved to fully closed position and the switch 12 is closed, thereby grounding the ignition circuit and disabling the same. When pressure is released at pad 3 of lever 1, the controls will move to their original positions under the action of spring means.

I claim:

1. Safety control mechanism for a motor vehicle comprising a lever connected with the throttle valve of the engine for controlling the same, a second valve in the engine fuel line which is normally in open position, an actuating means for the second valve disposed in the path of movement of said lever but normally out of engagement with the same, whereby, upon excess actuation of said lever, said second valve will be closed thereby stopping the flow of fuel to the engine.

2. The combination of elements recited in claim 1, and means operated upon excess actuation of the lever for disabling the ignition system of the engine.

HAROLD BOLINGER NUMER.